April 18, 1950 W. A. DICKSON 2,504,397
FISHING TOOL ATTACHMENT
Filed Dec. 11, 1945

Wilburne A. Dickson,
INVENTOR.

BY Bernard P. Miller
ATTORNEY

Patented Apr. 18, 1950

2,504,397

UNITED STATES PATENT OFFICE 2,504,397

FISHING TOOL ATTACHMENT

Wilburne A. Dickson, Gretna, La.

Application December 11, 1945, Serial No. 634,203

4 Claims. (Cl. 294—86)

My invention relates to oil well fishing tools, and more particularly to an attachment or "sub" to be attached within the drilling string adjacent a fishing tool, for forcing the fishing tool away from the well wall during the fishing operation.

Oil well fishing tools often fail to grapple the "fish," because the "fish" is disposed in the center of the bore hole, and due to a sloping hole, the fishing tool rests against the well wall. The word "fish" as used herein is intended to mean any object which is stuck in a well.

The prime object of the present invention is to provide a fishing tool attachment which renders it possible to substantially center the fishing tool concentrically in a bore hole.

Another object is to provide a device of this class which will permit circulation of fluid into and through the "fish" after it has been engaged.

A further object is to provide a fishing tool attachment which may be operatively controlled from the earth's surface.

An additional object is to provide a device for the purposes set forth which is comparatively cheap to manufacture, which is positive in action, and which is durable.

Figure 2:
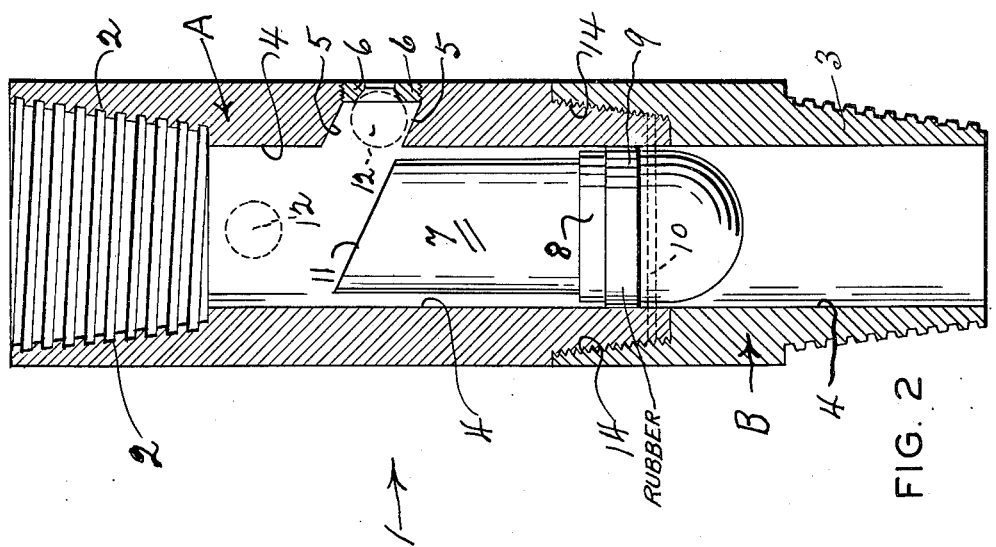
Figure 1:
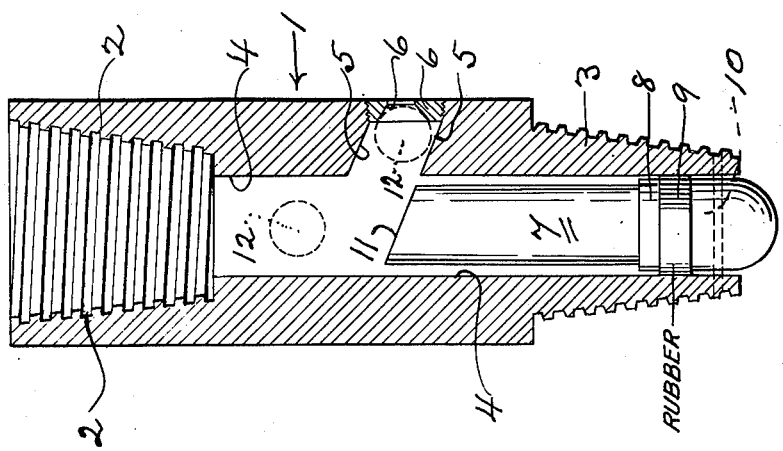

Other objects will be apparent from the accompanying one sheet of drawings, wherein:

Figure 1 is a vertical sectional view showing an embodiment of the invention which is constructed of a one-piece body; and, Figure 2 is a similar view showing the body made in two threadedly connected sections.

Like characters of reference designate like parts in the figures wherein they occur.

The reference numeral 1 indicates, as a whole a tubular body or "sub" having an upper box 2 and a lower pin 3, whereby it may be installed in a pipe line, not shown, above a fishing tool. The body 1 has an axial through bore 4 extending throughout its length. Intermediate its ends, the bore 4 intersects a lateral passage 5 leading outwardly through the wall of the body.

The outer end of the passage 5 is threaded to receive a nipple 6 which reduces the diameter of the passage 5 to form a nozzle or jet when a stream of liquid is forced therethrough under pressure. Nipples 6 having various desired diameters may be interchanged in the passage 5, to obtain various degrees of fluid outlet.

Within the lower end of the bore 4, there is provided a wooden plug 7 having a slightly enlarged head 8 which closes the bore 4. The head 8 is provided with an exterior annular sealing element 9 of some suitable resilient material, such as rubber.

A sheer-pin 10 extends laterally through the wall of the pin portion 3 of the body 1, and also through the head 8 of the wooden plug 7.

The upper end of the plug 7 is bevelled, as shown at 11, and is so located that it coincides substantially with the lower wall of the passage 5.

In operation, the plug 7 is installed in the lower portion of the bore 4 by insertion of the shear pin 10. The body is then threadedly connected to the upper end of the fishing tool, and also to the lower end of the lowermost section of pipe in the fishing string, neither of which are shown in the drawings.

During the fishing operation, liquid may be forced downward through the pipe string and outwardly through the lateral passage 5 and nozzle 6. The action of the outwardly projecting stream of liquid escaping through the nozzle 6 against the well wall, acts to move the fishing tool to the center of the bore hole so that it may engage a concentric "fish" therein.

After the "fish" has been engaged by the fishing tool, a lead ball 12 will be dropped through the pipe string, and due to the bevelled upper end 11 of the plug 7, the ball will be directed into the lateral passage 5, to lodge against and close the bore in the nipple 6.

Sufficient pump pressure will then be delivered through the pipe string and the bore 4 of the body 1 to shear the shear-pin 10 and permit downward movement of the plug 7. Circulation through the fish will thereby be obtained. Circulation may be reversed, if desired, to unseat the ball 12, so that it may drop downwardly through the bore 4 and out of the body 1.

The above described body 1 could well be made in two screwed-together sections, if desired, and such an embodiment is illustrated in Figure 2 of the drawings. In this embodiment, the body 1 is formed of upper and lower sections A and B respectively, and the sections are connected together by threads 14.

If desired, the body could be provided with a plurality of radially spaced lateral passages 5.

Obviously, the device could well be constructed in forms other than the preferred embodiments shown and described herein, without detrimentally effecting its function, and I therefore do not wish to be confined to specified structure further than I am limited by the scope of the appended claims:

I claim:

1. A tool for spacing a string of pipe from the wall of a well, including: a tubular body adapted to be connected in the string to form a continuation thereof, said body having at least one lateral passage through its wall for exhausting fluid; a removable plug for closing the bore of said body immediately below said passage; a ball adapted to be dropped into said bore above said plug; means carried by the plug for directing said ball into said passage to close the same; and a seat for the ball in the passage.

2. A tool for spacing a string of pipe from the wall of a well, including: a tubular body adapted to be connected in the string to form a continuation thereof, said body having at least one lateral passage through its wall for exhausting fluid; a removable plug for closing the bore of said body immediately below said passage, said plug adapted to be forced longitudinally out of said body by fluid pressure; a ball adapted to be dropped into said bore above said plug; a bevelled surface on said plug for directing said ball into said passage to close the same; and a seat in said passage for the ball.

3. A tool for spacing a string of pipe from the wall of a well, including: a tubular body adapted to be connected in the string to form a continuation thereof; said body having an outlet for exhausting a stream of liquid laterally in order to push the element away from the well wall; removable means for closing the bore of said body immediately below said outlet, and a ball adapted to be dropped into said bore above said plug, and means for directing said ball into said outlet for closing the same.

4. Structure as specified in claim 3, in which said closing means includes: a plug in said bore; and a shear-pin for anchoring the plug in place, said plug adapted to be forced from said bore by fluid pressure, so as to open the bore to fluid flow.

WILBURNE A. DICKSON.

REFERENCES CITED

The following references are of record in the file of this patent:

UNITED STATES PATENTS

| Number | Name | Date |
|---|---|---|
| 1,653,900 | Gregory | Dec. 27, 1927 |
| 1,908,174 | O'Grady | May 9, 1933 |
| 2,167,194 | Anderson | July 25, 1939 |